United States Patent Office
3,541,104
Patented Nov. 17, 1970

3,541,104
PROCESS FOR THE PREPARATION OF
AZIRIDINE DERIVATIVES
Wataru Nagata, Nishinomiya-shi, and Shoichi Hirai, Ibaraki-shi, Japan, assignors to Shionogi & Co., Ltd., Osaka, Japan
No Drawing. Filed May 27, 1968, Ser. No. 732,057
Int. Cl. C07d 57/00
U.S. Cl. 260—293                    23 Claims

ABSTRACT OF THE DISCLOSURE

A process for preparing bridged aziridine derivatives useful as reagents for organic synthesis, particularly for the synthesis of various polymers and of isoquinuclidine alkaloids.

---

The present invention relates to a process for the preparation of aziridine derivatives useful as reagents for organic synthesis or intermediates thereof and having novel and peculiar spatial arrangement, which is characterized by interacting an unsaturated primary amine represented by the Formula I with a halonium reagent, lead tetraacetate, or mercuric oxide to yield a cage-like bridged aziridine derivative represented by the Formula II.

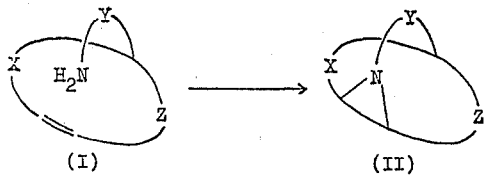

Where X, Y and Z each represents the same or different alkylene group containing one or two carbon atoms, and they may also be associated with optional groups, such as double bond, halogen atom, nitro group, alkyl group, alkoxy group, hydroxy group, mercapto group, carboxyl group, acyloxy group, amino group, amide group, alkylene group, and other bridged or condensed ring systems, at the optional position as far as no disturbing the reaction in the molecule. Of course, these substituents may optionally be changed in practice of the present invention.

The reaction utilized in the present invention appears to be attributable to the α-elimination reaction accelerated by the neighbouring olefin group, and it might be assumed that the reaction, without going through the free nitren-intermediate, proceeds through a certain transition state with the concerted mechanisms. Hence, the starting compounds must satisfy the steric requirement that the primary amine side chain can be axial and the double bond is arranged at the position spatially closed to the amine side chain.

The starting compounds (I) preferably used in the present invention are specifically exemplified as follows:

3-cyclopentene-1-methylamine
3-cyclopentene-1-ethylamine
3-cyclohexene-1-methylamine
3-cyclohexene-1-ethylamine
4-cycloheptene-1-methylamine
4-cycloheptene-1-ethylamine
2,2,3-trimethyl-3-cyclopentene-1-methylamine
2,2,3 - trimethyl-3-trimethyl-3-cyclopentene-1-ethylamine
2,2,3-trimethyl-3-trimethyl-3-cyclopentene-1-ethylamine
1,2,2-trimethyl-3-cyclopentene-1-ethylamine
α-amino-3-cyclopentene-1-acetic acid
4-fluoro-3-cyclohexene-1-methylamine
4-methoxy-3-cyclohexene-1-methylamine
4-ethoxy-3-cyclohexene-1-methylamine
α-amino-3-cyclohexene-1-acetic acid
3-methyl-3-cyclohexene-1-methylamine
4-methyl-3-cyclohexene-1-methylamine
α,1-dimethyl-3-cyclohexene-1-ethylamine
α-ethoxymethyl-β-nitro-3-cyclohexene-1-ethylamine
α-aminomethyl-3-cyclohexene-1-methanol
α-aminomethyl-3-cyclohexene-1-methanethiol
6-aminomethyl-3-cyclohexene-1-methanol
α-amino-6-methyl-3-cyclohexene-1-acetamide
1-methyl-3-cyclohexene-1-methylamine
5-ethyl-3-cyclohexene-1-methylamine
$\Delta^2$-octaline-4a-methylamine
$\Delta^1$-octalin-4a-methylamine
$\Delta^3$-octalin-1-methylamine
$\Delta^4$-octalin-2-methylamine
7-methoxy-3,4,4a,9,10,10a-hexahydrophenanthrene-4a-methylamine
7-methoxy-1,2,4a,9,10,10a-hexahydrophenanthrene-10a-methylamine
7-methoxy-4a-aminomethyl-1,2,3,4,4a,10a-hexahydrophenanthren-2-ol
$\Delta^9$-hydroanthracene-4a-methylamine and the like. These starting materials are almost the known compounds or can easily be prepared from the known compounds according to the known methods, for example, by reducing and dehydrating a β-oxonitrile prepared by hydrocyanation of α,β-unsaturated ketone which was previously developed by the present inventors.

The reagents used in the present invention are halonium reagents such as N-halogenocarboxylic acid amides or imides such as N-bromoacetamide, N-chlorosuccinimide, N-bromosuccinimide, N-iodosuccinimide, N-bromophthalimide etc., hypohalogenous acid salts, esters or acylate such as sodium hypochlorite, t-butyl hypochlorite, acetyl hypochlorite etc., halogen silver acetate mixture, or other halonium reagents, or lead tetraacetate or mercuric oxide. The reaction is carried out in an inert solvent in which the starting material and reagent can be soluble, at optional temperature such as —10° C. to the boiling temperature of the solvent, and proceeds smoothly within about a day. As inert solvent, benzene, dichloromethane, tetrahydrofuran, ethanol, ethylene glycol, water, or other most organic solvents may be used. In this reaction, a basic catalyst such as potassium carbonate is preferably added.

The objective compounds (II) are slightly basic, and therefore using this basicity, can effectively be isolated from the reaction mixture. For example, isolation is carried out by extracting with an aqueous acid solution followed by alkalization and then extraction with an organic solvent, or alternatively by extraction of the crystalline salts formed with a suitable acid or a quaternary ammonium salt forming reagent. The suitable acids for the formation of the salts are inorganic acids such as hydrochloric acid, sulfuric acid, nitric acid, hydrobromic acid, hydroiodic acid, phosphoric acid, perchloric acid, arsenic acid, acid platinic chloride, chloroauric acid etc., or organic acids such as saturated or unsaturated aliphatic acids, e.g. acetic acid, propionic acid, varelic acid, caproic acid, enanthic acid, pelargonic acid, arylic acid, crotonic acid, isobutyric acid, cyclohexaneacetic acid, levulinic acid, phenylacetic acid, phenoxyacetic acid, citric acid, tartaric acid, malic acid, oxalic acid, maleic acid, succinic acid, glutaric acid, suberic acid, fumaric acid, maleic acid, aconitic acid etc., aromatic acid, e.g. phthalic acid, slicylic acid etc., sulfonic acids, e.g. methanesulfonic acid, ethanesulfonic acid, benzenesulfonic acid, p-toluenesulfonic acid, bromobenzenesulfonic acid, phenolsulfonic acid, flavianic acid etc., phenolic acid, e.g. picric acid, styphnic acid, picrolonic acid etc., and the like. The preferred quaternary ammonium salt forming reagents are methyliodide, ethyliodide, methylbromide, ethylbromide, cetylbromide, benzylchloride, benzylbromide, and the like.

The resulting final compounds II and salts thereof are utilized as catalyst in the reaction of organic syntheses, particularly in condensation, and are useful as basic polymer, particularly the starting material or additive material for homo- or copolymer such as ion-exchange resin, thermoplastic resin, bacteriocidal polymer, liquid ion-exchange material, surfactants, or the like. The components II are also useful as intermediates for the preparation of isoquinuclidine alkaloids, such as ibogamine, ibogaine, ibogaline, vincristine, vinblastine etc., useful as medicaments, for example, which may be prepared according to the following reaction sequence.

hours and filtered under suction. The filter is extracted with 20% aqueous tartatic acid solution and the extract is strongly alkalized with potassium carbonate and then extracted with ether. The ether extract is dried over anhydrous potassium carbonate and evaporated to dryness to give 2.08 g. of 5-methyl-1-azatricyclo[3.2.1.0$^{2.7}$]-octane.

To a solution of the above compound in 3 ml. of anhydrous ethanol is added a solution of 12.5 g. of flavianic acid in 17 ml. of anhydrous ethanol under ice-cooling. After allowed to stand for 1 hour, the precipitated crystals are filtered and recrystallized from ethanol-dichloromethane to give 4.75 g. of the flavianate having MP. 187–189° C.

*Analysis.*—Calcd. for $C_{18}H_{19}N_3O_8S$(percent): C, 49.43; H, 4.38; N, 9.60; S, 7.31. Found (percent): C, 49.23; H, 4.62; N, 9.27; S, 7.43.

A suspension of the resulting compound in ether is

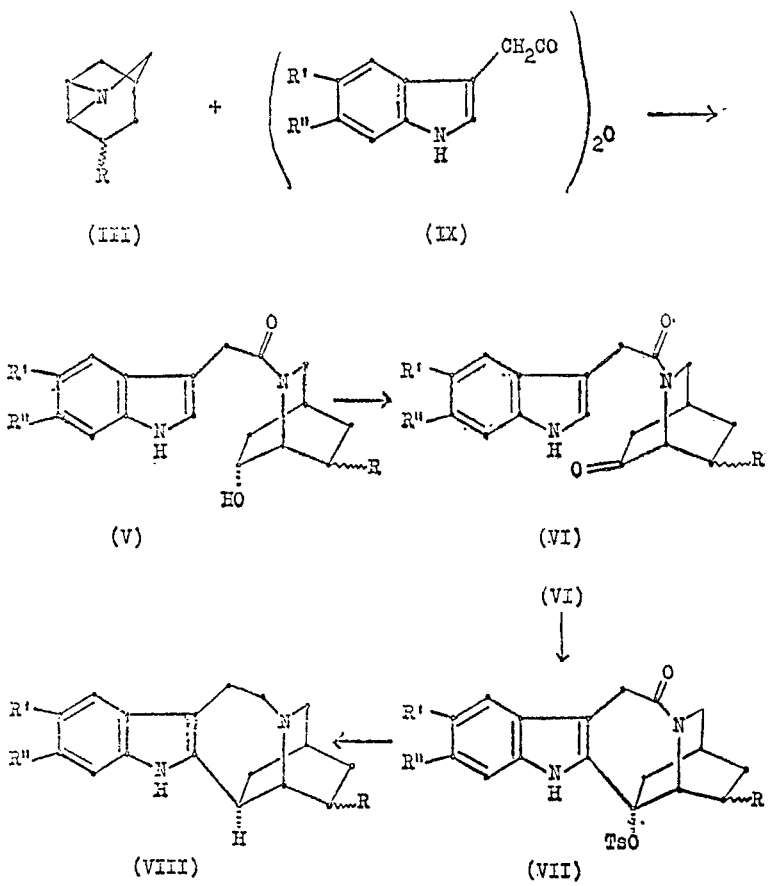

(wherein R is a hydrogen atom or methyl group; and R' and R" are the same or different and each is hydrogen atom or methoxy group). That is, the process comprises interacting an aziridine compound (III), prepared in this invention, with an indoleacetic acid anhydride (IV) to give an isoquinuclidine (V), oxidizing the latter by Oppenauer's method to give a carbonyl compound (VI), cyclizing the latter with p-toluenesulfonic acid to give a compound (VII), and then reducing the latter with aluminum hydride to give the final compound (VIII).

The invention will be better explained by the following examples which are not intended as a limitation thereof.

EXAMPLE 1

To a solution of 2.5 g. of 1-methyl-3-cyclohexene-1-methylamine and 2.76 g. of anhydrous potassium carbonate in 120 ml. of anhydrous benzene is added 36 g. of lead tetraacetate within a period of 20 minutes under nitrogen atmosphere, ice-cooling and stirring. The reaction mixture is then stirred at 34° C. for 10 shaken with dilute sodium hydroxide solution to reproduce the free amine. The ether layer is dried over anhydrous potassium carbonate, and evaporated to dryness under reduced pressure. The residue is purified on vacuum distillation to give pure 5-methyl-1-azatricyclo[3.2.1.0$^{2.7}$] octane as a colorless oil having B.P.$_{0.25}$ 25° C. (bath temperature). $n_D^{23}=1.4753$.

IR: $\nu_{max}^{CCl_4}$ 3345, 3015, 2997, 1635, 1219 cm$^{-1}$

*Analysis.*—Calcd. for $C_8H_{13}N \cdot 1/4H_2O$ (percent): C, 75.24 H, 10.66; N, 10.97. Found (percent): C, 75.12; H,10.73; N, 11.37.

The same procedure as described above affords the picrate (M.P. 157–159° C.) the styphinate (M.P. 161–163° C) and the picrolonate (M.P. 182–186° C.), which on treatment with an alkaline solution afford the same free amine, respectively.

EXAMPLE 2

A solution of 3.2 g. of 5-methyl-1-azatricyclo [3.2.1.0$^{2.7}$]-octane flavianate in ether is shaken with dilute sodium hydroxide solution. The ether layer is dried over anhydrous potassium carbonate and evaporated to dryness under reduced pressure (20 mm. Hg) and ice-cooling to give 1.02 g. of 5-methyl-1-azatricyclo-[3.2.1.0$^{2.7}$]octane as a colorless oil.

The resulting compound is dissolved under nitrogen atmosphere in 7 ml. of methyl iodide cooled at −50° C., and the mixture is stirred for 2 hours at the same temperature, and then evaporated to dryness under reduced pressure (15 mm. Hg) to give 1.40 g. of the corresponding methiodide as white prisms having M.P. 120–135° C.

EXAMPLE 3

To a solution of 2.2 g. of 3-cyclohexene-1-methylamine and 2.76 g. of anhydrous potassium carbonate in 100 ml. of anhydrous benzene is added 36 g. of lead tetraacetate within a period of 20 minutes under nitrogen atmosphere, ice-cooling and stirring. The reaction mixture is then stirred for 10.5 hours and filtered under suction. The filtrate is extracted with 20% aqueous tartaric acid solution and the extract is strongly alkalized with potassium carbonate and then extracted with ether. The ether extract is dried over anhydrous potassium carbonate and evaporated to dryness to give 1.85 g. of 1-azatricyclo-[3.2.1.0$^{2.7}$]octane as a light yellowish oil.

The resulting compound is treated with flavianic acid in anhydrous ethanol, and the product is recrystallized from ethanol-dichloromethane to give 5.6 g. of the flavianate having M.P. 217—219° C.

*Analysis.*—Calcd. for C$_{17}$H$_{17}$O$_8$N$_3$S (percent): C, 48.22; H, 4.04; N, 9.92; S, 7.55. Found (percent): C, 48.65; H, 4.33; N, 9.71; S, 7.53.

The resulting salt is treated in the same procedure as Example 1 to reproduce the free amine, i.e. pure 1-azatricyclo[3.2.1.0$^{2.7}$]octane as a colorless transparent oil.

IR: $\nu_{max.}^{CCl_4}$ 3350, 3010, 1633, 1212 cm$^{-1}$.

EXAMPLE 4

To a solution of 1.34 g. of Δ$^2$-trans-octalin-4a-methylamine and 1.15 g. of anhydrous potassium carbonate in 50 ml. of anhydrous benzene is added 15 g. of lead tetraacetate within a period of 5 minutes under ice-cooling. The reaction mixture is then stirred at 34° C. for 5 hours, and the insoluble material is filtered off. The filtrate is extracted with 20% aqueous tartaric acid solution and the extract is alkalized with potassium carbonate and then extracted with ether. The ether extract is dried over anhydrous potassium carbonate and evaporated to dryness under reduced pressure below room temperature to give 1.20 g. of 3,8a-methano-trans-perhydroaziridino[1,2-b]isoquinoline as a light reddish oil.

According to the same procedure as Example 1 or 3, the above compound is treated with flavianic acid in anhydrous ethanol to give 2.26 g. of the corresponding flavianate having M.P. 180° C. (decomp.) (recrystallized from ethanol-dichloromethane).

*Analysis.*—Calcd. for C$_{21}$H$_{23}$N$_3$O$_8$S (percent): C, 52.83; H, 4.86; N, 8.80; S, 6.70. Found (percent): C, 52.53; H, 5.03; N, 8.50; S, 7.00.

The same procedure as described above affords the picrate having M.P. 163–165° C.

EXAMPLE 5

To a solution of 1.1 g. of 5-ethyl-3-cyclohexene-1-methylamine(1,5-trans) and 2.2 g. of anhydrous potassium carbonate in 80 ml. of anhydrous benzene is added 3.55 g. of lead tetraacetate in every 5 times at one hour interval (total 17.75 g.), under nitrogen atmosphere, ice-cooling and stirring. The reaction mixture is then stirred at 35° C. for 22 hours and filtered under suction. The filtrate is extracted with 20% aqueous tartaric acid solution and the extract is washed with benzene-ether, strongly alkalized with ice-cooled potassium carbonate and then extracted with ether. The ether extract is dried over anhydrous potassium carbonate and evaporated to dryness under reduced pressure to give 880 mg. of 3-(exo)ethyl-1-azatricyclo[3.2.1.0$^{2.7}$]octane as a light yellowish oil. Picrate: M.P. 167–169° C.

*Analysis.*—Calcd. for C$_{15}$H$_{18}$N$_4$O$_7$ (percent): C, 49.18; N, 4.95; N, 15.30. Found (percent): C, 39.01; H, 4.87; N, 15.07. Styphinate: M.P. 147–149° C. Flavianate: M.P. 142–144° C.

EXAMPLE 6

To a solution of 1.1 g. of 3-cyclohexene-1-methylamine in 40 ml. of anhydrous benzene is portionwise added 26 g. of lead tetraacetate in every 5 times at one hour interval, at room temperature under nitrogen atmosphere and stirring. The reaction mixture is stirred at 34–37° C. for 6 hours, allowed to stand overnight at room temperature, and then filtered under suction. The filtrate is extracted with 20% aqueous tartaric acid solution and the extract is alkalized with potassium carbonate and then extracted with ether. The ether extract is dried and evaporated under reduced pressure below room temperature. The resulting crude material is checked by thin layer chromatography and the remaining of the starting amine is detected (about 20%). Therefore, the crude material is treated with 200 mg. of phenyl isocyanate in the conventional manner and the further treatment with 20% tartaric acid as described above affords 618 mg. of the basic portion and 390 mg. of the neutral portion respectively. To a solution of 618 mg. of the basic portion in 1 ml. of anhydrous benzene is added a solution of 2.3 g. of flavianic acid in 3 ml. of ethanol under ice-cooling and the reaction mixture is allowed to stand overnight in an ice-box. The precipitated crystals are collected by filtration to give 718 mg. of 1-azatricyclo[3.2.1.0$^{2.7}$]octane flavianate having M.P. 190–196° C.

EXAMPLE 7

To a solution of 1.25 g. of 1-methyl-3-cyclohexene-1-methylamine in 120 ml. of anhydrous benzene is portionwise added 6.65 g. of lead tetraacetate in every 3 times at one hour interval at room temperature under nitrogen atmosphere and stirring. The reaction mixture is stirred at 40° C. for 6 hours, allowed to stand at room temperature overnight, and then filtered. The filtrate is extracted with 20% aqueous tartaric acid solution and to the extract is added aqueous sodium picrate solution (10.4 g./150 ml.) under stirring and ice-cooling. The precipitated crystals are filtered, dried in vacuo, and recrystallized from methanol-dichloromethane to give 1.97 g. of 5-methyl-1-azatricyclo[3.2.1.0$^{2.7}$]octane picrate having M.P. 154–159° C.

EXAMPLE 8

To a solution of 0.62 g. of 5-ethyl-3-cyclohexene-1-methylamine(1,5-cis) and 1.2 g. of anhydrous potassium carbonate in 40 ml. of anhydrous benzene is added portionwise 2.0 g. of lead tetraacetate in every 5 times at 45 minutes interval under stirring and nitrogen atmosphere. The reaction mixture is stirred at 30–34° C. for 17 hours and then filtered under suction. The filtrate is extracted with 20% tartaric acid aqueous solution and the extract is strongly alkalized with potassium carbonate under ice-cooling and then extracted with ether. The ether extract is dried over anhydrous potassium carbonate and evaporated to dryness to give 530 mg. of 3-(endo)ethyl-1-azatricyclo[3.2.1.0$^{2.7}$]octane as a light yellow oil.

What we claim is:

1. A process for preparing aziridine derivatives of the general formula:

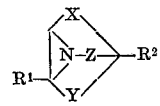

the fundamental skeletal ring not involving the N-atom of which may be condensed with one or two cyclohexane rings at optional positions forming as the whole a decalin or perhydroanthracene structure or with the aliphatic portion of a tetralin ring forming a hexahydrophenanthrene structure, wherein $R^1$ represents a hydrogen atom, a lower alkyl group, a lower alkoxy group, or a halogen atom, $R^2$ a hydrogen atom or a lower alkyl group, X a methylene or ethylene which may be substituted by a methyl group, Y a methylene or ethylene which may be substituted by one or two groups selected from the group consisting of methyl group, ethyl group, and hydroxy group, Z a methylene or ethylene which may be substituted by one or two groups selected from the group consisting of methyl group, hydroxy group, mercapto group, carboxy group, carbamoyl griup, nitro group, and ethoxymethyl group, which comprises interacting an unsaturated primary amine of the general formula:

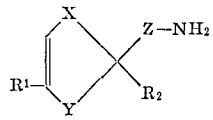

the fundamental skeletal ring of which may be condensed with the cyclohexane ring or the tetralin ring at optional positions as described above, wherein $R^1$, $R^2$, X, Y and Z each has the same significances as described above, with a reagent selected from the group consisting of a halonium reagent, lead tetraacetate and mercuric oxide.

2. The process claimed in claim 1 wherein the halonium reagents is N-bromosuccinimide.

3. The process claimed in claim 1 wherein the halonium reagent is sodium hypochlorite.

4. The process claimed in claim 1 wherein the halonium reagent is t-butyl hypochlorite.

5. The process claimed in claim 1 wherein the reagent is lead tetraacetate.

6. The process claimed in claim 1 wherein the reagent is mercuric oxide.

7. A process for preparing aziridine derivatives of the general formula:

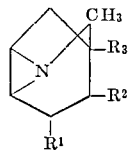

wherein $R^1$ represents a hydrogen atom or a lower alkyl group; $R^2$ a hydrogen atom; $R^3$ a hydrogen atom or a lower alkyl group; or $R^2$ and $R^3$ can be bound to each other forming a tetramethylene group, which comprises interacting an unsaturated primary amine of the general formula:

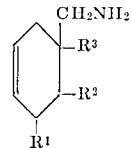

wherein $R^1$, $R^2$ and $R^3$ each has the same significances as described above, with a reagent selected from the group consisting of a halonium reagent, lead tetraacetate and mercuric oxide.

8. A compound having the general formula:

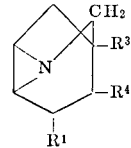

wherein $R^1$ represents a hydrogen atom or a lower alkyl group; $R^2$ a hydrogen atom; $R^3$ a hydrogen atom or a lower alkyl group; or $R^2$ and $R^3$ can be bound to each other forming a tetramethylene group.

9. A compound according to claim 8, namely, 5-methyl-1-azatricyclo[3.2.1.0$^{2.7}$]octane.

10. The picrate of the compound of claim 9.

11. The styphinate of the compound of claim 9.

12. The picrolonate of the compound of claim 9.

13. The flavianate of the compound of claim 9.

14. The methiodide of the compound of claim 9.

15. A compound according to claim 8, namely, 1-azatricyclo[3.2.1.0$^2$]octane.

16. The flavianate of the compound of claim 15.

17. A compound according to claim 8, namely, 8a-methanotrans-perhydroaziridino[1,2-b]isoquinoline.

18. The flavianate of the compound of claim 17.

19. The picrate of the compound of claim 17.

20. A compound according to claim 8, namely, 3-ethyl-1-azatricyclo[3.2.1.0$^{2.7}$]octane.

21. The flavianate of the compound of claim 20.

22. The picrate of the compound of claim 20.

23. The styphinate of the compound of claim 20.

References Cited

Buyle, Chem. & Ind. 1966 (5), 195.
Gassman et al., J. Org. Chem. 32 (8), 2388–91 (1967).
Logothetis, J. Am. Chem. Soc. 87 (4), 749–54 (1965).
Nagata et al., J. Am. Chem. Soc. 89 (19), 5045–6 (1967).

HENRY R. JILES, Primary Examiner

G. T. TODD, Assistant Examiner

U.S. Cl. X.R.

260—2.1, 294.7, 294, 294.3, 293.4, 293